United States Patent
Stalaw et al.

[11] Patent Number: 5,839,693
[45] Date of Patent: Nov. 24, 1998

[54] AIRCRAFT REFUELING SYSTEM

[76] Inventors: Michael Stalaw, 25 Hapoel Street, Herzeliya, Israel; Ilana Hecht, 51 Hickory Ln., Closter, N.J. 07624

[21] Appl. No.: 808,431

[22] Filed: Feb. 28, 1997

[30] Foreign Application Priority Data

Mar. 20, 1996 [GB] United Kingdom .................. 9605800

[51] Int. Cl.⁶ .............. B64F 1/28; B63B 35/53
[52] U.S. Cl. ................ 244/114 R; 244/135 R; 114/261; 114/122
[58] Field of Search ............ 244/144 R, 135 R; 114/261, 122

[56] References Cited

U.S. PATENT DOCUMENTS

| | | | |
|---|---|---|---|
| 769,693 | 9/1904 | Forbes | 114/122 X |
| 1,341,677 | 6/1920 | Roberts | 114/261 |
| 1,670,524 | 5/1928 | Sachs | 114/261 |
| 1,753,399 | 4/1930 | Blair | 114/261 X |
| 1,854,336 | 4/1932 | King | 114/261 |
| 1,896,546 | 2/1933 | Kulik | 114/261 |
| 2,092,250 | 9/1937 | Hagan | 114/261 |
| 2,107,886 | 2/1938 | Creed | 114/261 |
| 2,405,092 | 7/1946 | Faben | 244/114 R |
| 2,678,017 | 5/1954 | Collins | 244/114 R X |
| 3,325,124 | 6/1967 | Bary | 244/114 R |
| 4,325,317 | 4/1982 | Wilford | 114/261 |
| 4,799,828 | 1/1989 | Gerogii | 244/114 R X |

*Primary Examiner*—William Grant
*Attorney, Agent, or Firm*—Jacobson, Price, Holman & Stern, PLLC

[57] ABSTRACT

A refuelling system for aircraft, and in particular to a cellular system for refuelling long range aircraft crossing oceans. A floating refuelling station for aircraft includes at least one container hull which is movable and a sloping platform supported by the container. The sloping platform has at least one runway thereon for take off and landing of aircraft. The container hull may be used to store aviation fuel for refuelling the aircraft, the movability of the hull may be used to orient the runway with respect to the direction of the wind and the runway has a ramp section inclined at an angle to help slow down landing aircraft and/or to help speed up aircraft taking off. The height of the runway above the sea surface needs to be sufficient to accommodate any loss of buoyancy due to outpourings of gas from the sea bed.

8 Claims, 7 Drawing Sheets

IN & OUT

AIRCRAFT REFUELING SYSTEM

BACKGROUND OF THE INVENTION

This invention relates to a refuelling system for aircraft, and in particular to a cellular system for refuelling long range aircraft crossing oceans.

Aircraft, such as passenger jets, on intercontinental flights crossing oceans may need to be fully or nearly fully loaded with fuel. During take off and the initial phases of the flight, considerable fuel must be burned to lift the weight of this fuel. Furthermore, an aircraft may not be able to climb to a more efficient higher altitude until part of the initial load of fuel is burned.

It is an object of the present invention to provide a cellular refuelling system that reduces the problem of having to fully or nearly fully fuel an aircraft on an intercontinental flight, and in particular a flight across an ocean.

SUMMARY OF THE INVENTION

According to the invention, there is provided a refuelling station for taking off and landing of aircraft, comprising at least one runway which has a ramp section inclined at an angle of at least 9° to help slow down landing aircraft or to help speed up aircraft taking off. The ramp section preferably is inclined at an angle of at least 18°. Such a station may be on a floating platform, or be land-based.

Also according to the invention, there is provided a refuelling station for refuelling aircraft in mid-ocean, comprising at least one container hull the bulk of which consists of an aviation fuel tank, means for mooring the container hull to the ocean floor, at least one runway supported by the container hull for take off and landing of aircraft and means for maneuvering the container hull so that the runway may be oriented with the direction of the wind. Such a station is referred to herein as a floating refuelling station.

Also according to the invention, there is provided a network of floating refuelling stations for refuelling aircraft, the stations being spaced at about equal distances along a transoceanic flight path, each of the stations comprising at least one container hull the bulk of which consists of an aviation fuel tank, means for mooring the container hull to the ocean floor, at least one runway supported by the container hull for take off and landing of aircraft and means for maneuvering the container hull so that the runway may be oriented with the direction of the wind.

The runway may advantageously have a ramp section inclined at an angle to help slow down landing aircraft and/or to help speed up aircraft taking off. This may allow the length of the runway to be shortened, so reducing the required size of the refuelling station. Alternatively, the runway may not be shortened so that during landing wear and tear on tires and brakes may be reduced by taking advantage of the ramp to slow the aircraft.

The fuel tank may comprise substantially the whole internal volume of the container hull, so that the refuelling station may take the full load from an ocean going supertanker.

The container is preferably stabilized by means of ballast provided at a depth of at least 20 m below sea level. The ballast may be provided in a compartment within the container hull, or in a separate container connected to the container hull.

The runway may advantageously have two ramp sections either side of a central raised and generally horizontal section, so that landing aircraft may land and take off by moving in the same direction. This is because it is desirable to have aircraft both landing and taking off into the wind, in order to reduce the take off or landing speed relative to the runway. If a floating refuelling station has just one ramp section, then it may in the presence of a strong wind need to be rotated through 180° in order to switch from accommodating landing to taking off.

In order to provide the maximum fuel volume to hull surface area, and also to help minimize any rotation imparted by winds, waves or currents, the container hull preferably has a generally half spherical form.

However, the container hull may have an elongate form in order to maximize the length of a runway, in which case, the container hull may have a generally part cylindrical form.

In order to provide a larger refuelling station, or increase the number of runways, more than one container hull may be linked together by a framework.

The refuelling station may have equipment to allow automatic take off and/or landing of aircraft.

BRIEF DESCRIPTION OF THE DRAWINGS

The invention will now be further described by way of examples with reference to the accompanying drawings in which.

DETAILED DESCRIPTION OF THE DRAWINGS

According to the present invention, a considerable amount of fuel can be saved by an aircraft, flying over a long distance, for example over an ocean. The dependence between fuel consumption and the aircraft range R, can be found from the known "Breguet Range Equation".

$$R = N \frac{V}{(SFC)} \frac{L}{D} \ln\left(\frac{W1}{W2}\right) \quad (1)$$

Here, V is the average air speed, SFC is the engine specific fuel consumption, L/D is the lift/drag ratio, W1 and W2 are the all-up weights at start and end of flight, and N is a correction factor to take account of inconsistency of units. For a given aircraft and given reiterated flight, the fraction NVL/[(SFC)D], can be estimated as a constant and denoted as a factor k. Then, the equation 1, can be re-written as $$R = k \ln\left(\frac{W1}{W2}\right) \quad (2)$$

Figure 1:
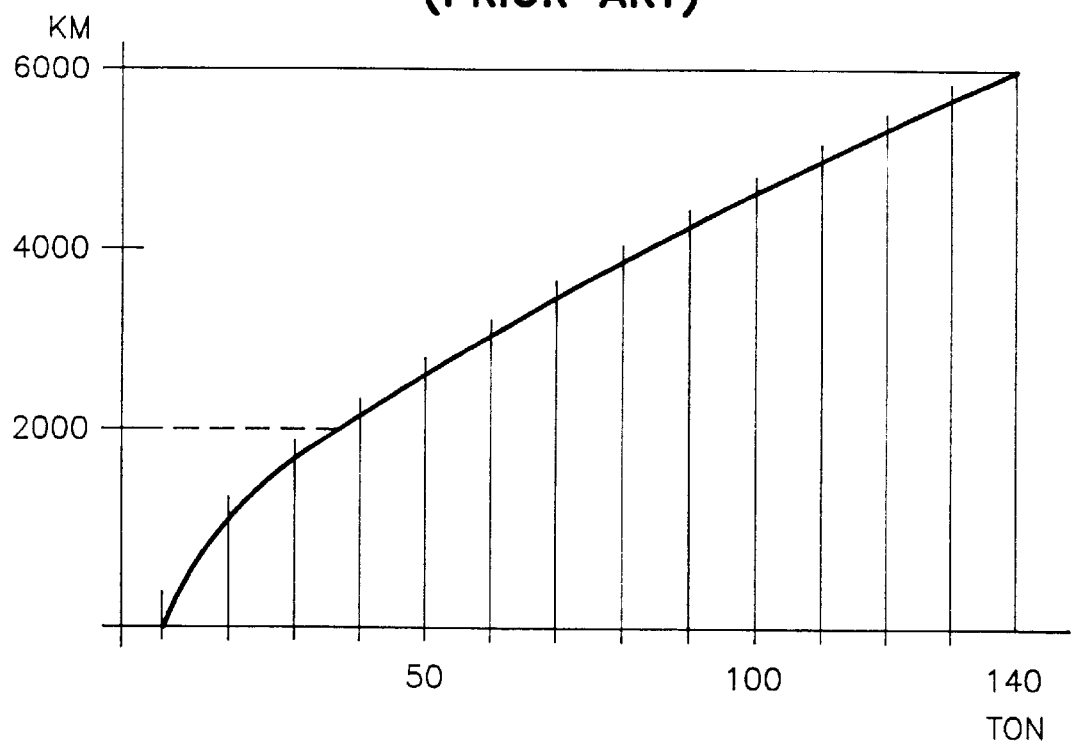
FIG. 1 shows the relation between the flight distance and fuel consumption of an aircraft.

The result of calculation, according to formula (2), is best visualized by drawing a curve, as shown in FIG. 1. We can see from the curve, that doubling the fuel weight ratio does not double the final range of the aircraft. In order to double the final range R, of the flight, it is necessary to enhance the fuel mass ratio much more. In other words, we get a comparatively small increase in flight range by increasing the amount of fuel. This is because for long distance flight, the aircraft must lift and drag not only the passengers and/or freight, but also the considerable mass of fuel to burn in the engines. Of course, unlike passengers or freight, fuel does not pay for transport, but is purely a cost.

According to the present invention, it is possible to build an artificial island refuelling station in the middle of an ocean, for example in the mid North Atlantic between New York and London. The flight from London to New York, or vice versa, would be divided in two stages. For example, in the first stage, the aircraft would fly about half way from London to the refuelling station in mid-ocean, with a relatively small amount of fuel on board. At the mid-station, the aircraft would be refuelled with a second relatively small portion of fuel, sufficient to arrive at the destination airport in New York.

The refuelling station in the middle of the ocean can be supplied with fuel by tankers (fuel ships), which may be very much cheaper than the alternative of transport of fuel by a non-stop passenger aircraft itself. The passenger aircraft can be refuelled after landing on the ocean refuelling station. As an alternative, the aircraft can also be refuelled, without landing, by means of a small ancillary refuelling airplane, which will take off from the station and refuel the aircraft during its non-stop flight. In this way, the aircraft will save a considerable amount of fuel, which is burned to transport this fuel itself.

Figure 2:
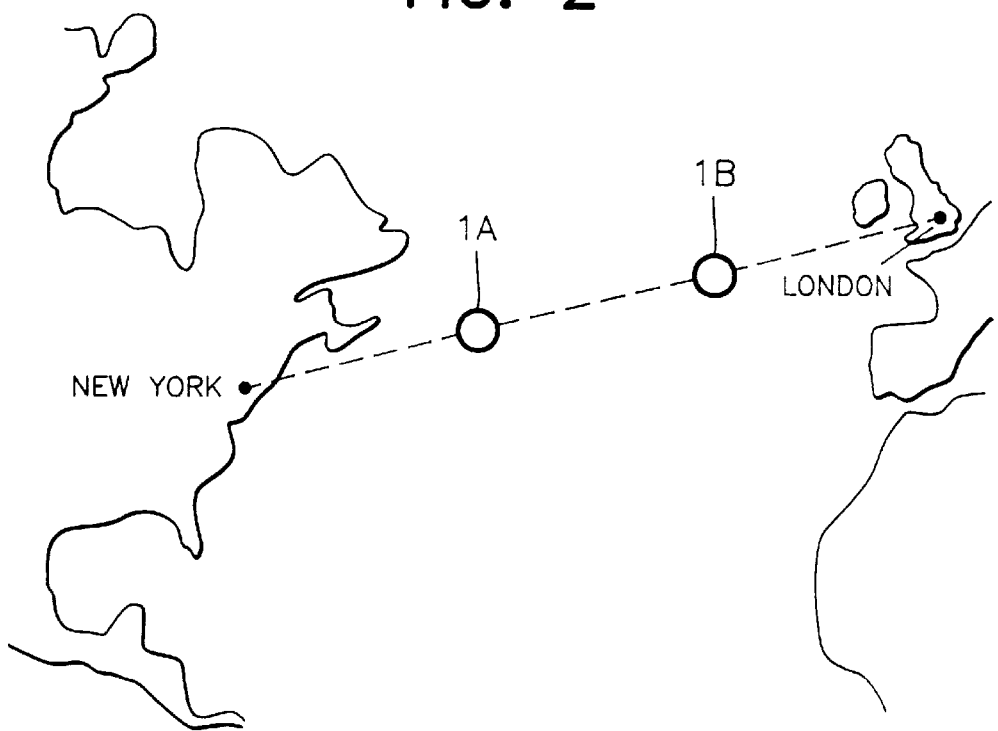
FIG. 2 shows a network of two floating refuelling stations according to the invention, between New York and London.

Instead of the saved fuel, the aircraft can take on board, an additional number of passengers, which will pay for the transport. Much more fuel can be saved by placing two artificial stations on the way between New York and London, as shown in FIG. 2. Here, the two ocean refuelling stations 1A and 1B, divide the distance between New York and London in three approximately equal parts.

Figure 3:
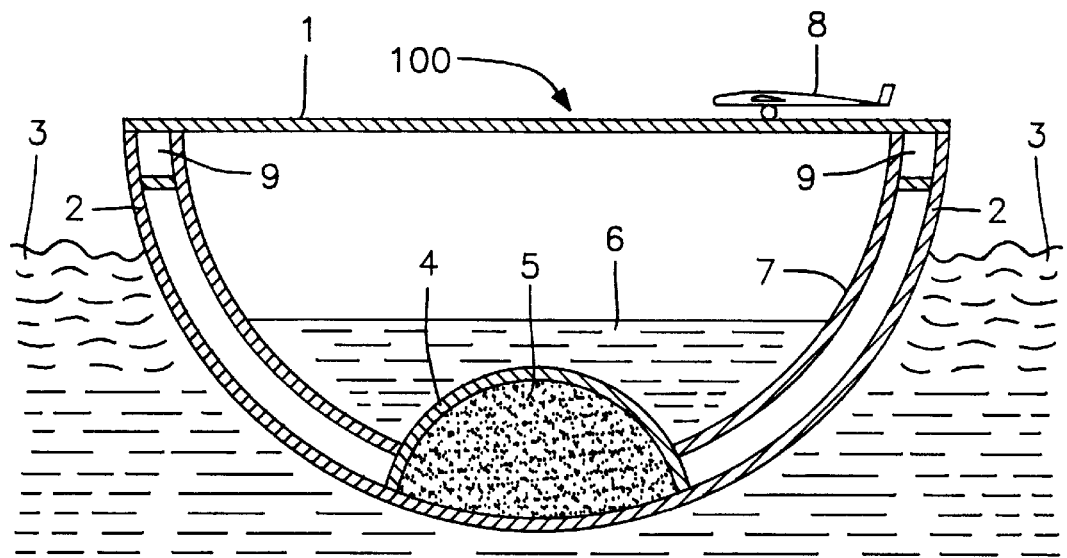
FIG. 3 shows a side sectional view of a floating refuelling station according to a first embodiment of the invention.
Figure 4:
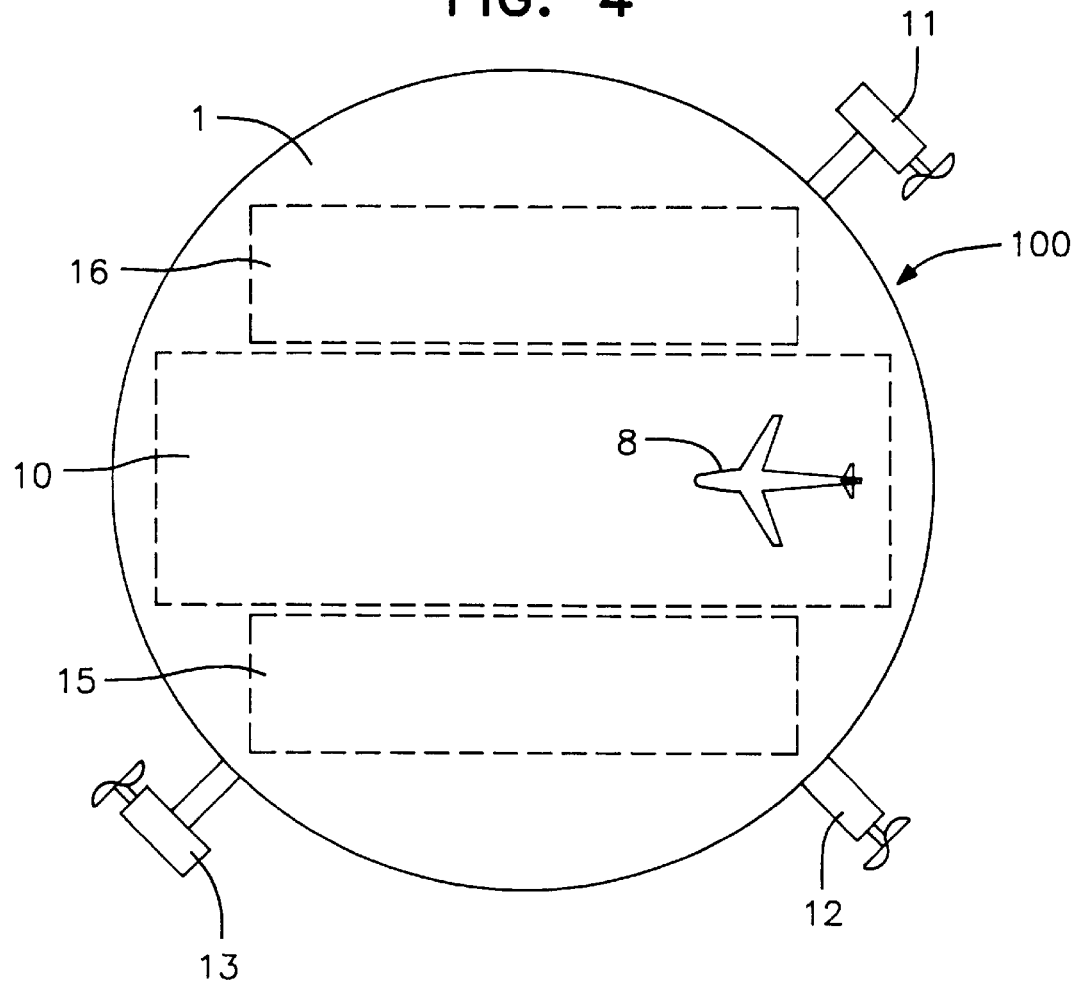
FIG. 4 shows a top plan view of the floating refuelling station of FIG. 3.

In FIG. 3 and FIG. 4 is shown schematically a construction of an ocean station, which is called hereinafter for short an "oceanstat". A first embodiment of an oceanstat 100 comprises a large mainly hollow container 2, which is floating in sea water 3. The container 2 has the form generally of a half sphere.

The half spherical container is covered by and supports a large platform 1. Inside the bottom of the container 2, is fastened another smaller inner container 4, which contains ballast 5, which may be a heavy material such as lead, iron etc.

The platform 1 will always rest in the sea 3 in a horizontal position, even during a storm. There are three reasons for this. Firstly, the inner container 4, which is filled with very heavy ballast 5, will gravitate to the centre of mass of the earth, and will always correct the angle of the container 2, and the position of the plate 1. Secondly, waves on the sea 3 never reach deeper than about 20 meters under the surface of the sea, even during a storm; but the heavy stabilizing container 4, is positioned much deeper than this. Thirdly, the rotary friction of a floating body of a spherical form in water is very small and equal in all directions. So any revolving forces will cancel and have no influence on the angular position of the container 2.

In view of the above reasons, the platform 1 will always rest in a horizontal position allowing an aircraft 8, to land on it or take off safely in any weather. It would be useful to install a double hull 7, preferably divided into water-tight compartments, which would prevent the refuelling station from sinking in case of an accident. Here numeral 6 indicates a stock of fuel supplied by tankers for refuelling any aircraft arriving at the oceanstat. A space 9 around the station and above the sea level can be used for such functions as a service or repair team, a workshop, hotel, restaurant and even casino and nightclub.

In FIG. 4, large aircraft 8 may land on a main runway 10, while smaller runways 15,16 are provided on either side of the main runway for smaller airplanes. A water motor 12 is provided for pushing and pulling to correct the location of the oceanstat 100.

The oceanstat 100 will, however, generally be moored with an anchor or tether (not shown) to prevent the oceanstat from drifting in ocean currents, waves or wind.

Two water motors 11,13 allow rotation the refuelling station around its vertical axis in order to correctly orient the runways 10,15,16 according to the direction of the wind to facilitate landing and take off of aircraft.

The oceanstat 100 should have also fuel pumps and pipes (not shown in the drawing) for refuelling the planes. It is, of course, also necessary to have an electric power station for all rooms and electric lamps along the runways for landing and take off at night.

Figure 5:
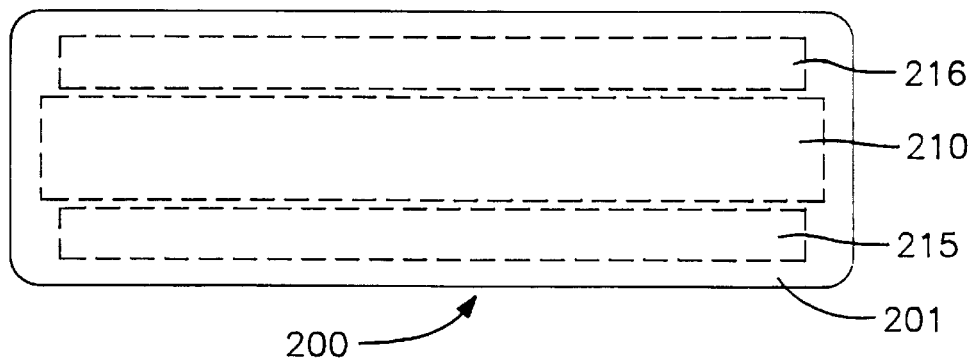
FIG. 5 shows a top plan view of a floating refuelling station according to a second embodiment of the invention.
Figure 6:
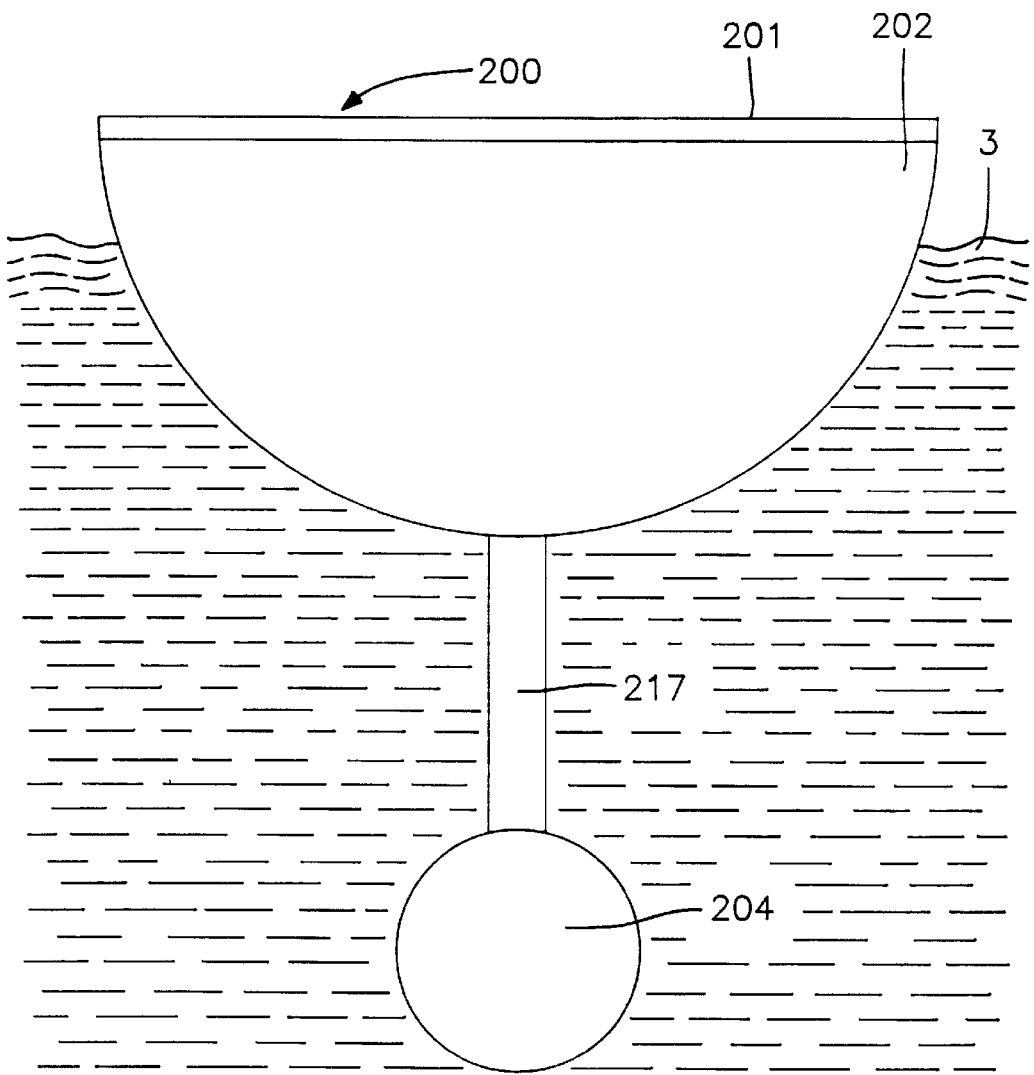
FIG. 6 shows a side view of the floating refuelling station of FIG. 5.

FIGS. 5 and 6 show a second embodiment of an oceanstat 200, comprising a container 202 in the form of a half cylinder instead of a half sphere. In this case a platform 201, for landing and take off has a rectangular form. Three parallel runways 210,215,216 are provided for landing and take off.

Such a refuelling station may be cheaper than a half spherical form station, but in this case a ballast container 204 should be provided much deeper to guarantee a stable horizontal position of the landing platform 201. This is realized by means of a long tube 217 which connects the main container 202 and the stabilizing ballast container 204.

Large heavy aircraft require a long runway for take off and landing. But a long runway would require a very large oceanstat, what is difficult to assemble. Accordingly the present invention provides a runway for "Short Take Off and Landing", which can be abbreviated to "STOL".

Figure 7:
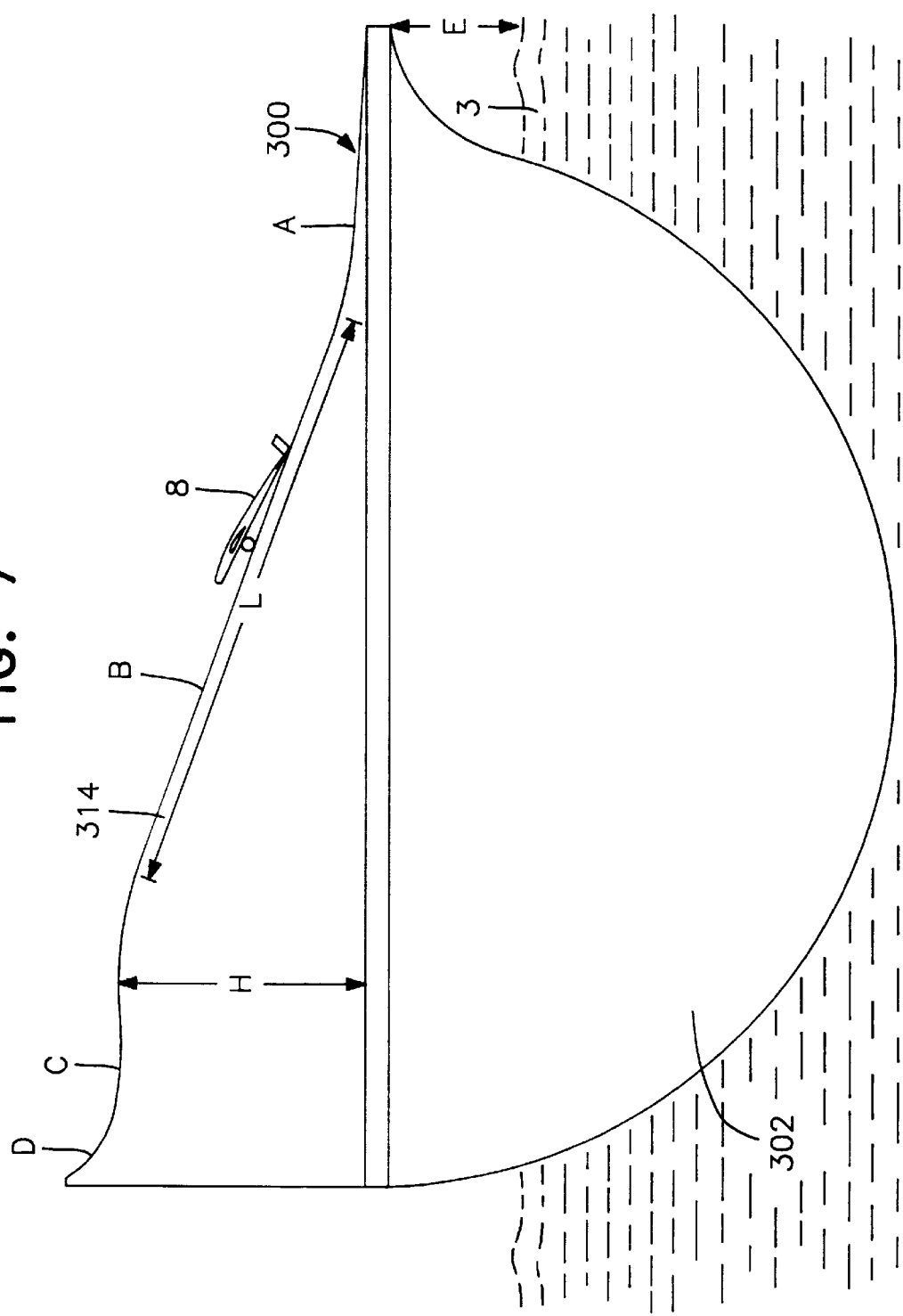
FIG. 7 shows a side view of a floating refuelling station according to a third embodiment of the invention.

The STOL system is illustrated in FIG. 7. Here a third embodiment of the oceanstat 300 has main container 302, which may be similar either to the main container 2 of FIG. 3, or the main container 202 of FIG. 6. However, instead of the flat horizontal platform 1,201 described above, here there is a sloping platform 314 with runways on it.

The sloping platform 314 has four distinct areas, indicated by reference letters A, B, C and D. An aircraft 8 arriving at the refuelling station should begin landing in the area A. Then the plane, by inertia will climb the rising slope of region B. In this region B, gravity will help to slow down the speed of the plane quickly, with or without using the brakes.

When the plane arrives at the horizontal region C, its speed is already sufficient slow, so that the pilot can easily stop the plane using the plane's brakes. The final rising region D provides an extra margin of safety.

The take off of the plane 8, should be carried out in the opposite direction. The plane will start in the horizontal region C. Then in the region B, the plane will be additionally accelerated by gravity. In the region A, the plane will already have a sufficient speed to take off.

This STOL method will also prolong the life of the airplane's wheels and brakes. The STOL system saves space and also fuel at take off. Therefore, it would be reasonable to use the system also in regular airports and aircraft carriers. Known automatic landing and takeoff systems may, of course, also be employed to provide a very smooth and safe landing and take off.

From FIG. 1, it can be seen that dividing the distance over the ocean into three segments by an additional oceanstat station, a much higher economic effect can be obtained. In FIG. 2, two refuelling stations are shown, which divide the distance from London to New York into three segments. An arrangement of two stations, will allow use of smaller airplanes (also for sport and tourism), with a smaller number of passengers on board. In this case an accident would cause fewer victims and less capital loss.

In Example 1, below, the economic effect using two artificial stations is calculated. It would be reasonable to locate more STOL stations of different companies near each other. In case of an accident they would be able to co-operate and prevent any risk.

EXAMPLE 1

Relevant data of an average passenger airplane crossing the Atlantic Ocean from New York to London is:

i) The weight of the empty plane plus 10% safety margin fuel Wo=114 ton
ii) The weight of the load Wl=50 ton
iii) Total weight of the consumed fuel Wf=140 ton
iv) Total weight at start W1=304 ton
v) Total weight at end of flight W2=164 ton
vi) The distance New York to London Ro=6000 km We will estimate the fuel consumption for an uninterrupted flight over a distance of 6000 km and compare this with the fuel consumption for the case shown in FIG. 2, where the distance is divided by two refuelling stations in three equal segments, each segment being 2000 km in length.

According to the formula (2):

$$R = k \ln\left(\frac{W1}{W2}\right) \tag{2}$$

from here we can find $$k = \frac{R}{\ln\left(\frac{W1}{W2}\right)} \tag{3}$$

Inserting the values for the distance R=6000 km, we will obtain:

$$k = \frac{6000}{\ln(304/164)} = \frac{6000}{\ln(1.854)} = \frac{6000}{0.617} = 9722; k = 9722$$

As we found the value for k=9722, we can find the fuel consumption for one segment equal to one-third of the total distance R1=R/3=2000 km. If the fuel consumption for R1=2000 km is designated by X, then:

$$R1 = k \ln\left(\frac{X}{W2}\right); \tag{4}$$

we can convert this to $$R1 = k \ln X - k \ln W2; \tag{5}$$

hence $$k \ln X = R1 + k \ln W2; \tag{6}$$

and $$\ln X = R1/k + \ln W2 \tag{7}$$

Now we can insert the values for R1=2000 km in the expression (7):

$$\ln X = 2000/9722 + \ln 164 = 0.2057 + 5.0999 = 5.3056$$

If ln X=5.3056, then we will find that: X=201.5
The consumption rate for R1 is:

$$Wf1 = X - W2 \tag{8}$$

which means Wf1=201.5−164=37.5 ton
The total consumption for the whole distance is:

$$Wt = Wf1 \times 3 \tag{9}$$

Wt=37.5×3=112 ton
So the saved fuel is $$Ws = Wf - Wt; \tag{10}$$

Ws=140−112=28 ton
that is (28/140)×100%=20%

Twenty percent of saved fuel multiplied by the number of flights per year, will give a considerable additional profit. But, instead of saving fuel, it is possible, according to the calculation, to change the form of the airplane so that it would be possible to load on board more passengers and/or freight. Since during any segment of the flight it will never be necessary to have on board more fuel than about 140/3= 47 ton (instead of 140 ton, as for a non-stop flight), it is possible to use the saving in the weight of fuel by carrying an additional weight of passengers and/or freight. The fuel weight savings is 140−47=93 ton.

For 400 passengers, the weight with their baggage is estimated to be 50 ton. The airliner can therefore take on board an additional 400 passengers. This would, of course require a new "super-jumbo" aircraft. Then since 93−50=43 ton, this means that 43 ton will remain for the weight of an additional 400 seats and for the wider form of the super-jumbo aircraft.

So, a super-jumbo aircraft compatible with the present invention, can take on board 800 passengers instead of 400. Assume for example that the average price of a ticket is about $400, then the additional profit for one flight would be:

Profit=400×400=$160,000.

Multiplying this sum by the number of flights and number of planes, a company can profit, almost for nothing, with an extraordinary sum, which is incomparable with the cost of a simple oceanstat STOL station.

A STOL station has additional advantages. It can serve as a safe shelter for planes and ships, in case of accidental calamity.

EXAMPLE 2

Here we will calculate the length and the angle of the slope runway of a STOL station, shown in FIG. 7. According to the known formula relating kinetic energy and potential energy, an aircraft of a mass M, moving at a landing velocity V, will rise to stop at a height H:

$$\frac{MV^2}{2} = MgH \quad (11)$$

hence $$\frac{V^2}{2} = gH \quad (12)$$

where g=9.81 m/s² is the acceleration due to gravity. From the formula (12), we find that:

$$H = \frac{V^2}{2g} \quad (13)$$

at this height H, the whole kinetic energy of the moving plane is converted to potential energy, and the aircraft will stop moving totally, without using the brakes. We note here that the height H, which is indicated in FIG. 7, at which the plane will totally stop, does not depend on its mass M. Assume that the plane drops its speed after braking on segment A=330 m to a velocity of V=90 km/hour; this is equal to (90×1000)/3600=25 m/s.

Then according to formula 13:

$$H = \frac{25^2}{2 \times 9.81} = \frac{625}{19.6} = 31 \text{ metre}$$

Assume we will make the length of the slope region B L=100 m, then H/L=sin X; sin X=18/100=0.31 and so we can find that the angle X=18 degrees.

This is a very shallow angle and a pilot can easily operate on it. Of course, braking may take place along segment B, as well, in which case the slope may be reduced to about 9 degrees, making the height of the ramp H only 16 m.

The region A of the runway should be at a height E distant over the highest waves, in the area of the ocean.

It will be appreciated by those skilled in the art that the above calculations use approximate data, and are therefore used as examples only to explain the invention in more detail.

To calculate finally the required height of the runway above the sea level, the distance E, it is desirable to take into account a hypothesis described in the UK Patent Application GB 2 287 081 A, on pages 24 and 25. According to this hypothesis, the centre of mass of the earth does not coincide with its geometric centre.

The centre of mass of the earth is a spherical layer, which radius is about 0.8 of the radius of the earth. In the early past, when the earth was still not solid, the weighty materials like uranium, gold, iron, should be attracted to the central sphere, while near around the geometrical centre of the earth, unlike the established hypothesis, there must be located more lightweight substances, like water, oil and even gases. It is easy to prove that the presence of ordinary uranium of a large quantum, should lead to periodic atomic reactions, that would periodically heat the interior gases. It would increase the internal pressure causing sometime a gigantic breakthrough of gases through the solid coating of the earth to the deeper areas of the ocean, where the resistance is less.

According to the principle of symmetry, on both sides of this central mass sphere, the material would be alike. So the gases inside the earth should be the same as our atmosphere. But during an atomic explosion, the oxygen would be burnt out, leaving nitrogen and CO. Therefore in an area of a gigantic breakthrough of gases, there is no more oxygen. All engines would suddenly stop. The pilot can land the plane by gliding only. The pilot and the passengers can breathe using the internal supplied oxygen. But the team of the refuelling station, should be prepared for such an accident, to use in such case, masks connected to containers of oxygen. According to the Archimedes principle, a body immersed in a fluid is buoyed up by a force equal to the weight of the displaced fluid. But there is no more ordinary fluid. There is a mixture of fluid and gas. The fluid encountered in applications for ships, was ordinary sea water. But during an immense ejection of nitrogen in the sea, a quick drop of the density of the water would happen, causing the refuelling station to be immersed much deeper. Such effect was sometimes observed in the Bermuda Triangle. Therefore, for correct calculation of the distance E of FIG. 7, it is necessary to determine the density of the water in the desired area of the station, at least over several years and take for calculation purposes the lowest value. Then we will be able to calculate the distance E of FIG. 7, with more sureness and chose for the refuelling station an absolute safe location.

EXAMPLE 3

Figure 8:
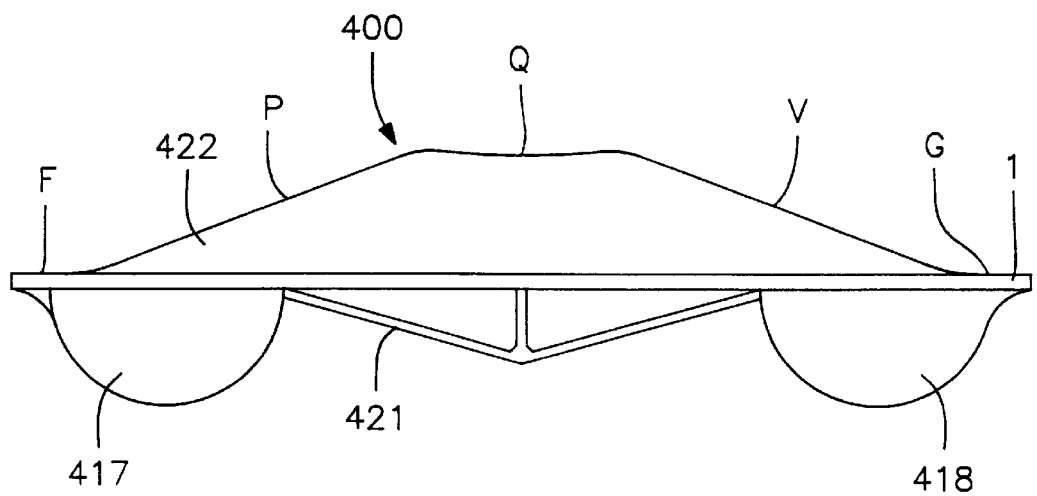
FIG. 8 shows a side view of a floating refuelling station according to a fourth embodiment of the invention.
Figure 9:
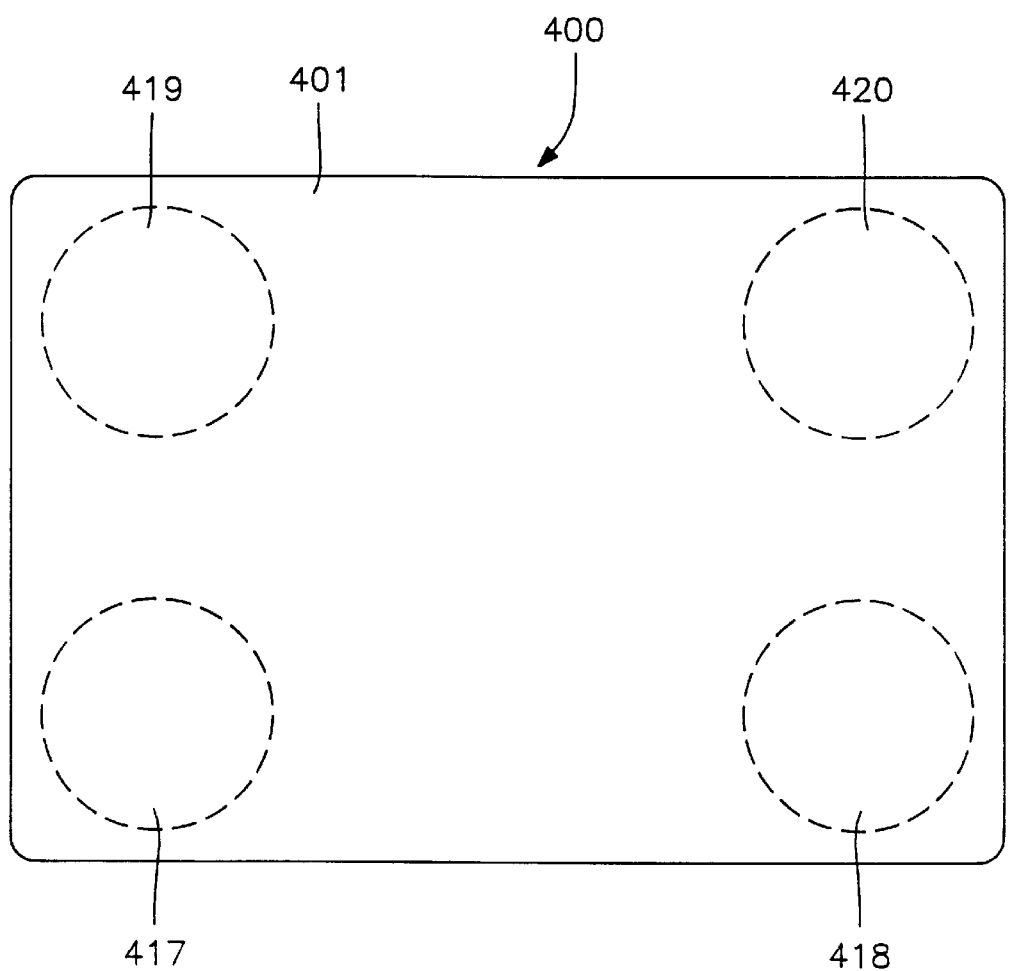
FIG. 9 shows a top plan view of the floating refuelling station of FIG. 8.

In FIG. 8 and FIG. 9 is shown a fourth embodiment of an enhanced oceanstat 400. The refuelling station consists four (or two) spherical containers 417,418,419,420. To the above containers is fastened a very large plate 401, which may be assembled from a plurality of small plates. A framework 421, is provided to obtain a rigid construction of the whole station. On such a large refuelling station can be built a STOL runway 422, with a double slope. An aircraft can now land in a lower area G, then by inertia will climb on a slope area V, and finally stop in a level upper area Q, where the plane will be refuelled. After refuelling, the aircraft will move in the same direction down the slope area P, where it will be accelerated to a second lower area F, where it will have a sufficient speed to take off. Of course it is possible to land the operation in opposite direction, that is, to land in area F, and take off in area G.

If it is necessary to repair an airplane, it can come down by means of an elevator, especially constructed for this purpose.

The STOL system is different from known Short Take Off and Landing systems. The STOL system can also be successfully utilised for airplanes of any size, navigated without a pilot, by means of electronic remote control devices.

The STOL system can also successfully be used on a land airport. To help take off and landing oriented substantially into the wind, a multitude of sloping runways may be built around a central artificial hill, which preferably has the shape of a frustum regular pyramid, or of a frustum right circular cone.

EXAMPLE 4

A large commercial airliner, arriving in the region of a floating oceanstat drops its speed to about 150 knots, using for this task the multitude of wing flaps on the trailing edge of the wings, which provide a vectorial elevating thrust and high lift. At the same time, a small ancillary airplane, having on board about 50 ton of fuel, takes off from the floating oceanstat and climbs to meet with the airliner at a predetermined altitude to refuel the airliner during continual flight. After refuelling, the ancillary airplane becomes much lighter, and can land on the oceanstat at a very low speed, or with more effective braking.

It is not difficult to predict that after the first oceanstat has been realized, all aircraft companies will follow and the oceans will be provided with thousands of such stations. Then in case of an accident the pilot would be able to jump with his airplane just in the ocean, being sure that he will always find there an oceanstat to land on. It will add sureness to many people that a flight over the ocean is absolutely safe, and that should multiply the number of flights.

EXAMPLE 5

Figure 10:
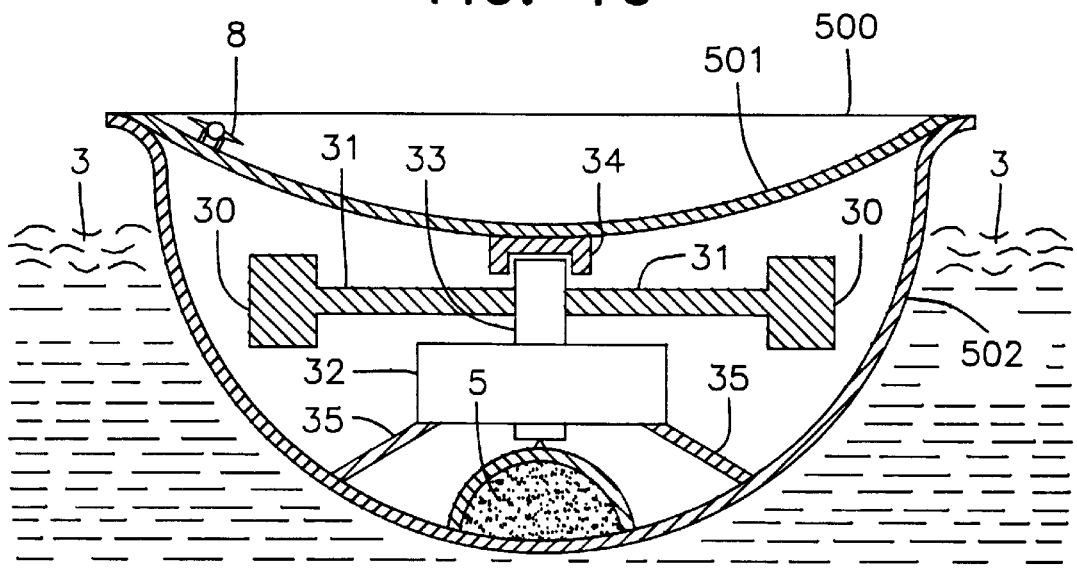
FIG. 10 shows a side view of an improved floating refuelling station according to present invention.
Figure 11:
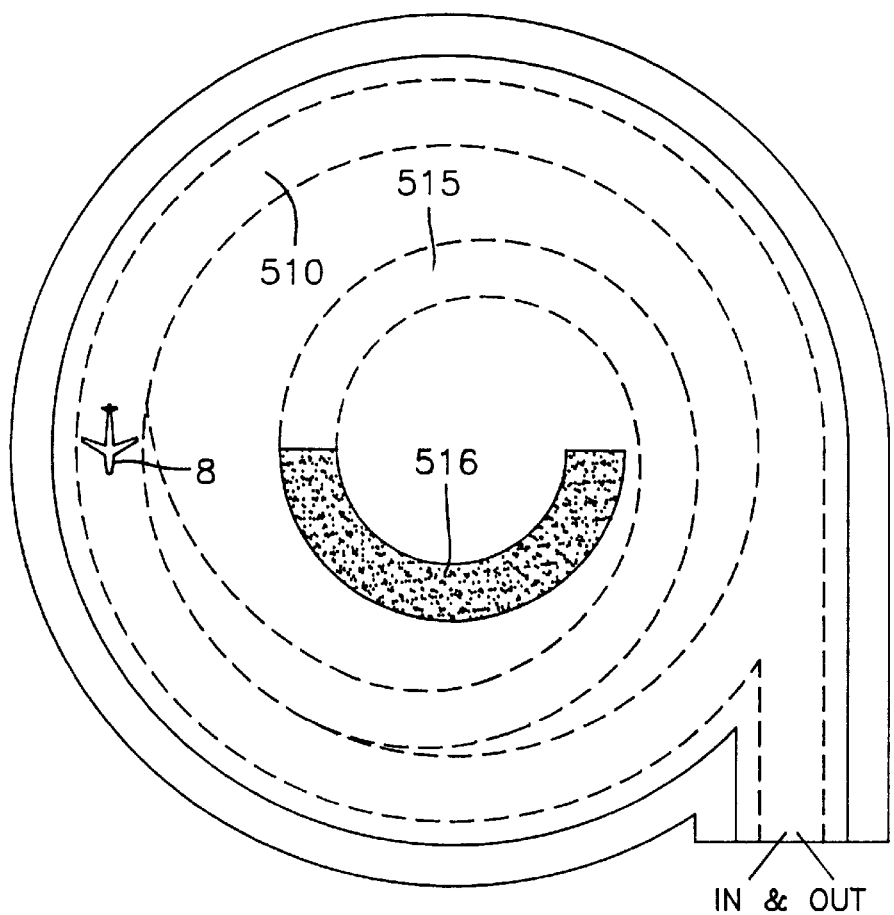
FIG. 11 shows a top plan view of the floating refuelling station of FIG. 10.
Figure 12:
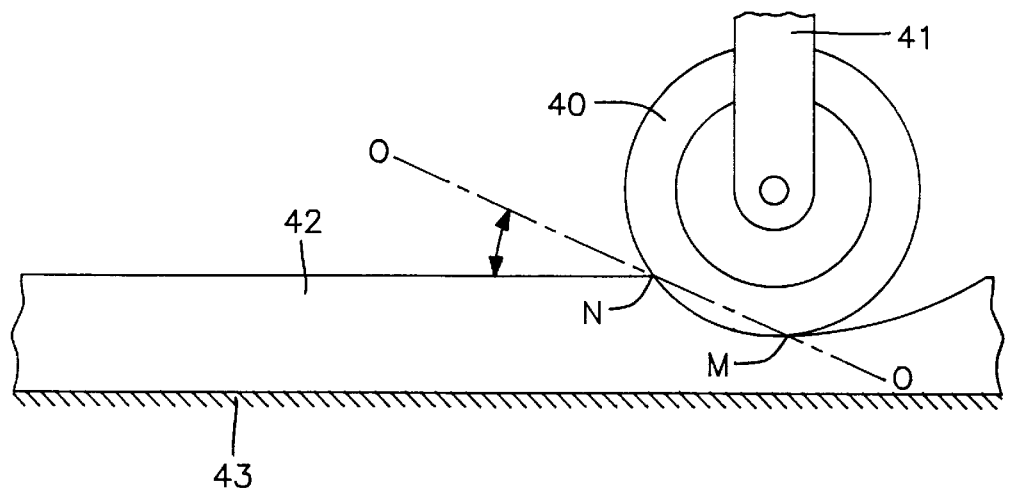
FIG. 12 shows a side view of a safe system for braking an aircraft on the surface a floating refuelling station.
Figure 13:
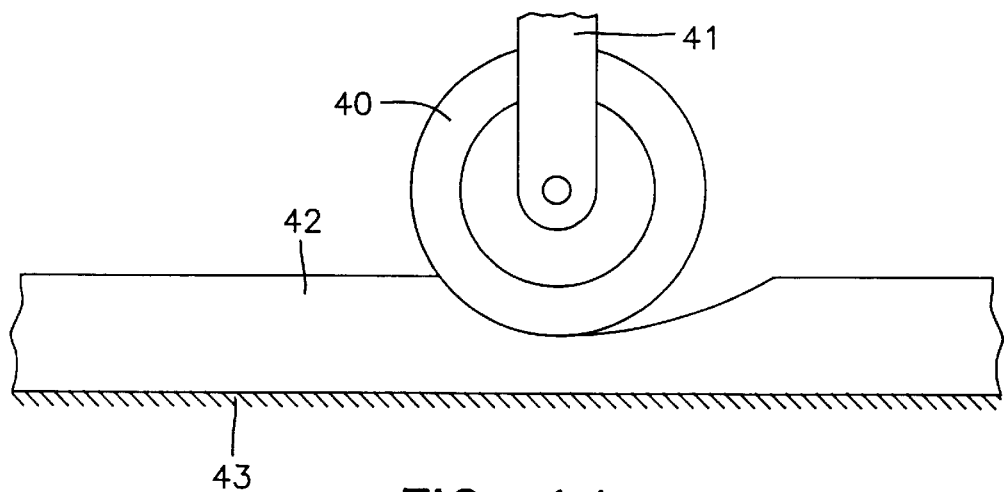
FIG. 13 shows a side view of the braking system of FIG. 12 in a second stage.
Figure 14:
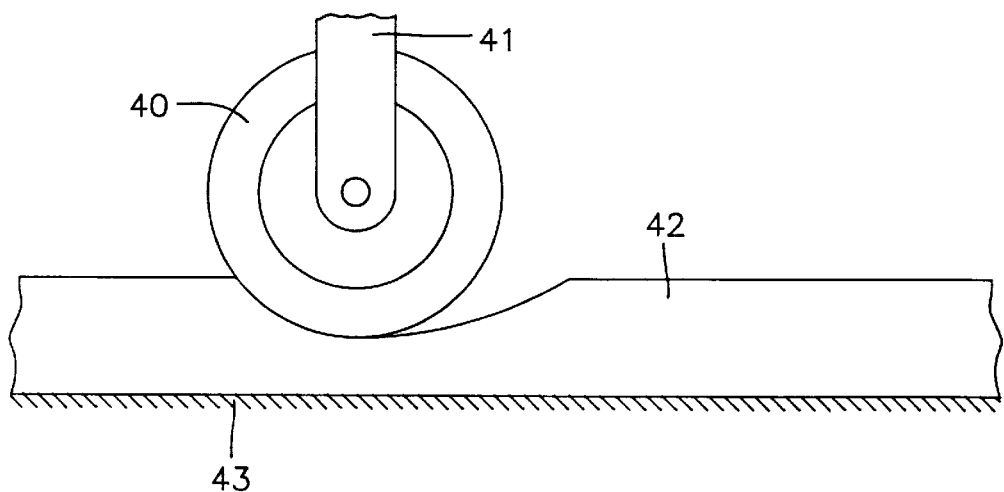
FIG. 14 shows a side view of the braking system of FIG. 12 in a third stage.

In FIG. 10 and FIG. 11 is shown a fifth embodiment of an oceanstat 500 with enhanced stability. Here is shown a section of a flywheel 30 of a large diameter 30, which rotates in a horizontal plane around a central axis 33, by means of a motor 32. Members 31, are spokes, which connect the flywheel 30 to the axis 33 of the motor 32. The motor 32 is fastened to the container 502 by means of brackets 35. Member 34 is an additional bearing which secures the position of the axis 33, against the oceanstat 500. The flywheel is an additional arrangement to the ballast 5, which should guarantee the horizontal position of the oceanstat even in a storm. The flywheel should rotate in bad weather only. Even better results can be obtained if the container 502 is made from a ferro/concrete material, which enlarges the inertia mass against quick changes. It also guarantees the durability of the oceanstat. The runway, 510 shown on FIG. 11, is made in form of a circle. Such construction of the runway allows a small oceanstat to receive very large airplanes, because the length of the runway is L L=π×D, where D is the diameter of the circular runway. If for example the diameter of the oceanstat is 400 meter, the length of the runway will be 1256 meter. Moreover the airplane 8, can run around several times and stop even without using the brakes. The input and output gate "in-out" of the runway is made on a horizontal plate. Further the runway overpasses to a concave plate 501, which is inclined down to the center, that counteract the centrifugal force, which act on the airplane 8 running in a circle. After the speed of the airplane is slowed down, the pilot can direct the plane down along a spiral runway 515 and finally stop at a special prepared margin of safety runway 516. This part of the runway is shown in FIG. 12, FIG. 13 and FIG. 14. The runway 43, is here covered by a thick layer of rubber 42. The wheels of the airplane moving from right to left are here permanently climbing from an already compressed point M to the next not compressed point N. at an angle X which depends on the elasticity of the rubber layer. The process of climbing at an angle X on the rubber layer is equivalent to the process of climbing of an airplane on the ramp of the sloping runway 314 of FIG. 7. Moreover, a wheel of an airplane touches the runway along an arc "M"–"N" instead of one point, to increase the braking force. This solution does not require a high and expensive construction and can be used everywhere. The oceanstat can have several "in-out" platforms in different directions, to allow to land and take off in different directions, according to the direction of the wind. The "in-out" platform can be provided with side walls (not shown in the drawings) to prevent the influence of a side wind on landing or take off of an airplane. Also the whole oceanstat can have round side walls against any wind. At the beginning the oceanstat will be used in summer, and when the prognosis of the weather is known several days in advance.

Now, even small airplanes will be able to cross the ocean safely. Now everybody having a small airplane will be able to travel safely around the world including across oceans.

We claim:

1. A cellular refuelling system for refuelling aircraft in mid-ocean, said cellular refuelling system comprising
at least two floating refuelling stations spaced at substantially equal distances along a trans-oceanic flight path, each of the stations including
an at least partial spherical container hull forming a fuel tank,
means for propelling said container hull to maintain a constant defined geographic location without anchoring to the ocean floor,
at least one runway supported by said container hull for take off and landing of aircraft,
ballast located greater than twenty meters below sea level and above the ocean floor for stabilizing a top of said container hull, and
means for maneuvering said container hull so that said runway may be oriented with respect to the direction of the wind.

2. A cellular refuelling system as claimed in claim 1, wherein said runway has a ramp section inclined at an angle to help slow down landing aircraft and to help aircraft taking off.

3. A cellular refuelling system as claimed in claim 1, wherein said container hull is stabilized by a flywheel of a large diameter, the flywheel being rotatable in a defined plane by a motor.

4. A cellular refuelling system as claimed in claim 1, wherein said container hull has a generally half spherical form and said runway has a circular spiral form.

5. A cellular refuelling system as claimed in claim 1, wherein said runway has a section covered by a thick layer of rubber to slow down said aircraft.

6. A cellular refuelling system as claimed in claim 1, wherein each of said refuelling stations have at least one ancillary airplane for taking off from said refuelling station and climbing to meet with aircraft at a predetermined altitude to refuel said aircraft during continual flight of said aircraft, the airplane landing back on said refuelling station.

7. A cellular refuelling system as claimed in claim 6, wherein said runway includes two sections, a first normal planar or horizontal section, used for landing of an arriving aircraft, and a second section, covered by a layer of elastic material for causing wheels of said aircraft to work against gravitational force and slow down said aircraft and stop said aircraft without using brakes, at a short distance so as to increase a life of said brakes.

8. A cellular refuelling system as claimed in claim 1, wherein the runway is assembled from three sections, a first horizontal input and output section used for landing aircraft or for take off of aircraft, a second middle ramp section inclined so that an arriving aircraft will slow down in speed by gravitational force without using brakes, or for increasing the speed of said aircraft by gravitational force in case said aircraft moves in an opposite direction toward the first section to take off from said first section, and a third raised and generally horizontal section for rest of said aircraft.

* * * * *